United States Patent [19]

Thioux

[11] Patent Number: 4,598,799
[45] Date of Patent: Jul. 8, 1986

[54] MULTI-DISC BRAKE
[75] Inventor: Alain Thioux, Chennevieres, France
[73] Assignee: Societe Anonyme D.B.A., Paris, France
[21] Appl. No.: 675,166
[22] Filed: Nov. 27, 1984
[30] Foreign Application Priority Data Nov. 30, 1983 [FR] France ................................ 83 19139

[51] Int. Cl.$^4$ ............................................. F16D 55/36
[52] U.S. Cl. ............................. 188/71.5; 188/218 XL; 192/70.17
[58] Field of Search ..................... 188/71.5, 71.4, 71.3, 188/71.2, 73.2, 218 XL, 18 A, 26, 58, 218 A; 192/106.1, 70.17

[56] References Cited

U.S. PATENT DOCUMENTS

| 2,397,642 | 4/1946 | Blazek et al. | 192/106.1 |
| 3,008,547 | 11/1961 | Rockwell | 188/71.5 |
| 3,146,860 | 9/1964 | Wilson | 188/71.5 |
| 3,752,267 | 8/1973 | Dovell et al. | 188/71.5 X |
| 4,356,901 | 11/1982 | Koehler et al. | 188/71.5 X |
| 4,474,276 | 10/1984 | Loizeau | 192/70.17 X |
| 4,520,916 | 6/1985 | Strub | 192/70.17 X |
| 4,540,067 | 9/1985 | Meynier | 188/71.5 |

FOREIGN PATENT DOCUMENTS

| 117815 | 9/1984 | European Pat. Off. . |
| 1131533 | 6/1962 | Fed. Rep. of Germany | 188/71.5 |
| 1087988 | 10/1967 | United Kingdom . |

Primary Examiner—Bruce H. Stoner, Jr.
Assistant Examiner—Michael P. Gilday
Attorney, Agent, or Firm—Larry J. Palguta; Ken C. Decker

[57] ABSTRACT

Multi-disc brake, of the type incorporating at least one first rotary disc firmly fixed to the wheel of the vehicle and a second rotary disc mounted so as to slide on a support component itself firmly fixed to the wheel, the driving in rotation of the second disc by the said support component being effected by the intermediary of complementary splines having a gear tooth profile. To overcome the undersirable effects of the tilting moment exerted on the sliding disc (2) by the thrust of the actuating cylinder (12), the invention is arranged to provide this disc with axial guiding projections (14) engaging in openings of corresponding shape (15) arranged in the other disc (1).

3 Claims, 3 Drawing Figures

U.S. Patent Jul. 8, 1986 4,598,799
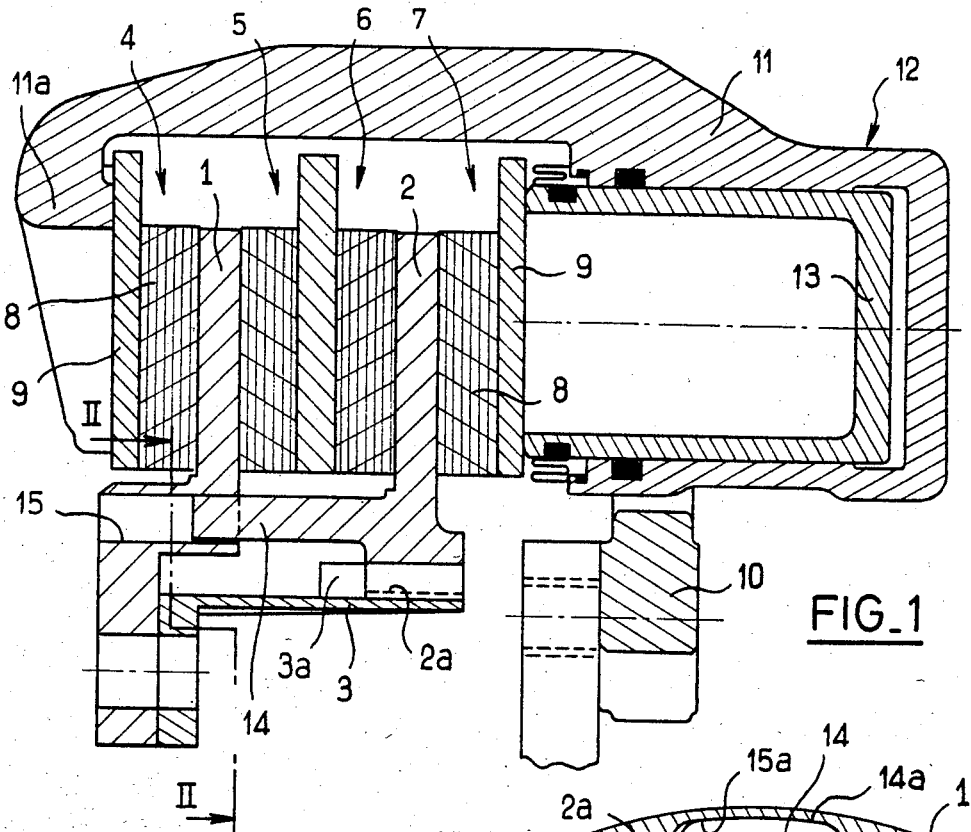
FIG_1
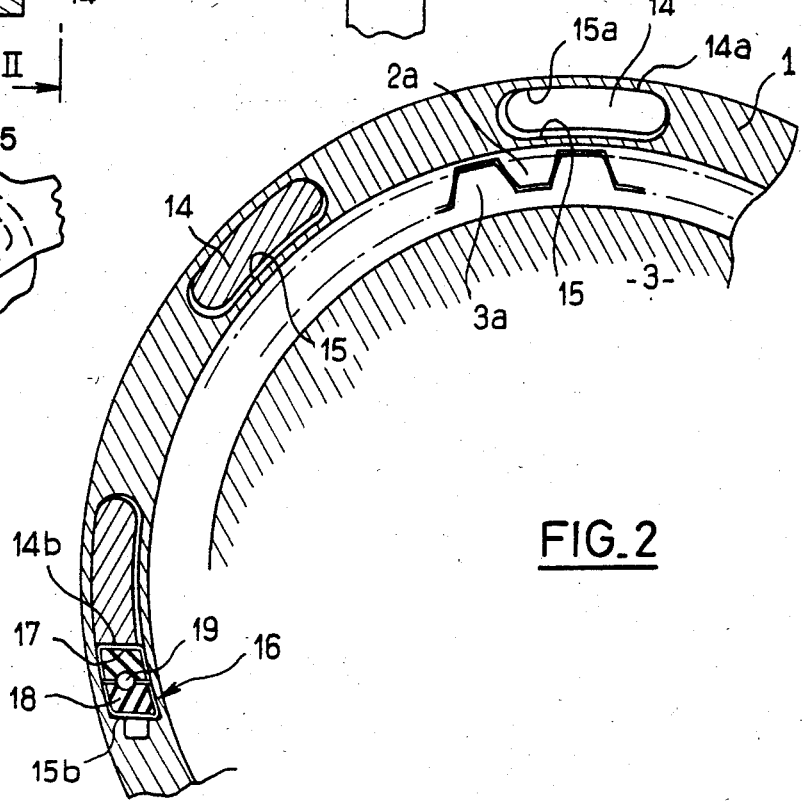
FIG. 3
FIG_2

MULTI-DISC BRAKE

The invention concerns a multi-disc brake, and more precisely a brake of the type incorporating a first rotary disc firmly fixed to the wheel of the vehicle and a second rotary disc mounted so as to be capable of sliding in the axial direction on a support component, also firmly fixed to the wheel, the second disc and the support component incorporating, for this purpose, complementary splines having a gear tooth profile, whose meshing together provides the driving in rotation of the second disc by the support component, while allowing their relative displacement in the axial direction, together with a set of friction pads carrying friction linings capable of being applied against the surfaces of the discs by an actuating device such as a hydraulic cylinder with a caliper, these linings only extending over a limited angular sector of the periphery of the discs.

The applicant company has already described, in its French Patent Application No. 83/10,917 filed June 30, 1983, how, in this type of brake, the sliding disc has a tendency to tilt during braking operations which can, in certain cases, lead to jamming of this disc on its support, and has proposed to improve its guidance in order to eliminate this disadvantage; the solution consisting, in the case where the sliding disc rests on a hub by the intermediary of a splined sleeve, of arranging annular co-operating guiding surfaces beyond the ends of the splines in order to oppose effectively the tilting of the disc.

This solution which gives excellent results in the case of brakes for heavy vehicles solely taken into consideration in the aforementioned Patent Application, does not apply, however, in the case of brakes for touring vehicles on account of the more limited space which is available for mounting the brake.

The aim of the present invention is therefore to propose a system for guiding the sliding disc which, while effectively opposing the tendency to tilt during a braking operation, does not increase, or does not appreciably increase, the general space occupied by the brake.

This aim is achieved, in accordance with the invention, in a multi-disc brake of the type defined in the opening paragraph of this specification, thanks to the fact that the arrangement for guiding the second disc, or sliding disc, in translation along its support component consists of projections of axial orientation, circumferentially spaced and carried by one of the discs and engaging in openings of complementary shape arranged in the other disc. Thus it is the walls of the said projections and the said openings in contact with one another which fulfil the purpose of co-operating guiding surfaces and which absorb the tilting moment exerted on the sliding disc, which therefore cannot compromise the proper operation of the brake by imposing undesirable stresses on the splines.

In a preferred embodiment of the invention, the aforementioned projections are carried by the second disc, or sliding disc, and are distributed on its inner periphery, close to the splines which firmly fix it in rotation to its support component. This arrangement, as is shown in the description which follows, is achieved without adding to the radial space occupied by the brake.

Advantageously, the projections and openings mentioned above can have cross-sections in the general shape of lunules. In such a case, the projections are made solid with the disc which carries them, and are only in contact at their external ground surfaces with the corresponding walls of the openings of the other disc, while a certain clearance may be arranged in the radial direction and the circumferential direction between their other surfaces and the corresponding walls of the said openings.

The characteristics and advantages of the invention will appear more clearly from the following description of a preferred embodiment, given simply by way of illustration, with reference to the accompanying drawings, in which:

FIG. 1 shows a diagrammatic longitudinal section of a brake constructed according to the invention;

FIG. 2 is a partial transverse section along the line II—II shown in FIG. 1 and

FIG. 3 is a schematic representation of a friction lining extending over a limited annular sector of the associated disc.

The multi-disc brake shown in FIG. 1 of the drawings incorporates a first rotary disc 1 fixed to the wheel (not shown) of the vehicle so as to accompany it in its rotation, and a second rotary disc 2 mounted so as to be capable of sliding in the axial direction on a support component 3, also firmly fixed to the wheel. For this purpose, the disc 2 is provided on its inner periphery with a continuous row of splines 2a profiled in the shape of gear teeth, which co-operate with splines 3a, of a complementary shape, provided on the outer periphery of the cylindrical support component 3; the meshing together of the splines 2a, 3a provides the driving in rotation of the disc 2 by the support component 3, while allowing their relative displacement in the axial direction.

Each of the brake discs 1 and 2 co-operates with a pair of friction pads 4, 5 and 6, 7 respectively, positioned on either side of the corresponding disc, and capable of being applied against the lateral surfaces of the latter. Each of these pads itself incorporates a friction lining 8 fixed on a lining carrier plate 9, which is itself mounted so as to be capable of sliding in the direction parallel to the axis of the brake on a fixed support 10 firmly fixed to a non-rotating portion of the axle.

A floating caliper 11 is positioned over the brake discs 1, 2 and their friction pads 4, 5, 6, 7 so as to cover the assembly. In the portion of the caliper 11, situated on the same side as the sliding disc 2, an actuating device is provided, such as a hydraulic cylinder 12 whose piston 13 is capable of acting on the lining carrier plate 9 of the inner pad 7, and, by reaction and owing to its notched flange 11a, on the lining carrier plate 9 of the outer pad 4, so as to control the tightening of the assembly of discs and pads in the axial direction and thus to create a braking torque between each lining and the adjacent disc surface. This action is accompanied by a displacement of the disc 2 in the direction parallel to the axis by sliding along the support component 3, this sliding being permitted, as described above, by the presence of the splines 2a, 3a.

However, due to the fact that the friction pads only cover a limited angular sector of the periphery of the discs, the operation of the brake has the secondary effect of applying to the sliding disc 2 a tilting moment in the plane of the drawing which, as described in French Patent Application 83/10,917, can create the risk, under certain conditions, of causing hammering and jamming of the splines, thus compromising the proper operation of the brake.

In order to avoid this disadvantage, the present invention provides for improvement of the guidance in translation of the sliding disc 2 by providing the latter with a circular row of projections 14 of axial orientation, these projections, essentially equidistant from one another in a circumferential direction, being directed towards the disc 1 and engaging in openings 15, of complementary shape, arranged in the latter. By studying FIG. 1 of the accompanying drawings, it is easily understood that the walls of the projections 14, and of the openings 15, which are in contact with each other, then constitute guiding surfaces which absorb the tilting moment being exerted on the sliding disc 2, this being all the better because the stresses on these surfaces are reduced in proportion to the length of the lever arm represented by the said projections. Although the projections 14 can in theory be carried by either disc, or partly by one and partly by the other, it is, however, apparently preferable, so as to obtain the best possible guiding effect in the minimum space, to position them on the sliding disc 2 by distributing them along its inner periphery, close to the splines 2a.

The projections 14 can, of course, be constructed in the form of cylindrical rods, attached to the disc 2 and engaging in circular openings of corresponding diameter (with slight clearance) arranged in the disc 1.

However, in a preferred embodiment of the invention which is shown in the drawings, the projections 14 are constructed in one piece (as a casting) with the disc 2 and they may thus be given advantageously a cross-section in a general lunule shape, as shown in FIG. 2 in the drawings. The openings 15 themselves, which can be made, for example, by milling in the base of the disc 1, thus match exactly the lunule shape. It is apparently desirable in these cases that contact between the projections and the openings be provided only by the external surfaces (suitably ground) 14a of the former, with the corresponding walls 15a of the latter, while a certain clearance is, however, arranged in the radial direction and also the circumferential direction between the other surfaces of the projections and the opposite walls of the openings. It should be noted that the displacements in translation of the disc 2 relative to the disc 1 cause continuous cleaning of the surfaces 14a, 15a are in contact with one another, which maintains the guiding surfaces in a good state of cleanliness despite all the possible causes of becoming dirty or corroded.

In order to prevent the circumferential clearance, allowed between the projections 14 and the openings 15, from giving rise to undesirable knocking phenomena, it seems advisable to provide a device for generating torque tending to retain one lateral flank of each of the projections 14, and the corresponding walls of the openings 15, so as to bear against one another, this being in the direction in which transmission of the braking torque takes place. This device, indicated by the reference 16 in FIG. 2 of the drawings, may consist, for example, of an elastic solid, compressed and inserted between the lateral flank 14b, which transmits no torque, of one of the projections 14, this flank being suitably square instead of rounded, and the corresponding wall 15b, also square, of the opening 15 with which it is associated. Advantageously, this elastic solid itself consists of two blocks 17, 18, made of elastomeric material and covered on three of their sides by sheet metal plates, intended to facilitate their introduction into the housing thus arranged between the walls 14b and 15b, these blocks then being separated from one another by a peg 19 inserted by force into a longitudinal passage defined between their opposite surfaces. It goes without saying, however, that other arrangements could be devised with the same ends without departing from the framework of the invention.

I claim:

1. A multi-disc brake for a vehicle, comprising a first rotary disc firmly fixed at a radially inner portion to a wheel of the vehicle and a second rotary disc mounted radially inwardly so as to be capable of sliding in an axial direction on a radially inner support component which is also fixed firmly to the wheel, said second rotary disc and the radially inner support component including complementary-shaped splines having a gear tooth profile and meshed together to provide rotation of the second rotary disc by the support component while allowing axial displacement of the second rotary disc, a set of friction pads carrying friction linings for application against surfaces of the discs by a hydraulic cylinder disposed in a caliper, the caliper extending radially outwardly and over the discs and friction linings and the friction linings extending only over a limited annular sector of peripheral areas of the discs, axial projections circumferentially spaced-apart and extending from the second rotary disc, the projections extending into and engaging complementary-shaped openings in the first rotary disc, the projections located at a radially inner portion of the second rotary disc and adjacent the splines which cause the second rotary disc to rotate with the radially inner support component, the projections and openings having lunule-shaped cross-sections and the projections integral with the second rotary disc, the projections having only radially outer surfaces engaging corresponding wall surfaces of the respective openings, each projection having radial and circumferential clearances with the respective opening, and a device for generating torque disposed between a lateral flank of at least one of the projections and an opposite wall of the corresponding opening, the device urging circumferentially the projections and openings against one another in engagement and in a circumferential direction corresponding to transmission of braking torque.

2. The brake according to claim 1, wherein the device comprises an elastic solid compressed and inserted between the lateral flank and opposite wall.

3. The brake according to claim 2, wherein the elastic solid comprises two blocks made of elastomeric material and biased apart from one another by means of a peg.

* * * * *